(12) United States Patent
Faith et al.

(10) Patent No.: US 8,447,272 B2
(45) Date of Patent: May 21, 2013

(54) AUTHENTICATION AND HUMAN RECOGNITION TRANSACTION USING A MOBILE DEVICE WITH AN ACCELEROMETER

(75) Inventors: Patrick Faith, Pleasanton, CA (US); Mark Carlson, Half Moon Bay, CA (US); Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 16 days.

(21) Appl. No.: 12/954,077

(22) Filed: Nov. 24, 2010

(65) Prior Publication Data

US 2011/0159850 A1  Jun. 30, 2011

Related U.S. Application Data (60) Provisional application No. 61/264,983, filed on Nov. 30, 2009, provisional application No. 61/264,543, filed on Nov. 25, 2009.

(51) Int. Cl.
*H04M 3/16* (2006.01)

(52) U.S. Cl.
USPC ..... 455/411; 455/410; 455/414.1; 455/414.2; 455/418; 455/550.1

(58) Field of Classification Search
USPC .............. 455/410, 411, 414.1, 418, 419, 566; 345/156, 168, 169, 174; 713/183, 202; 340/525, 340/691.1, 691.3
See application file for complete search history.

(56) References Cited

U.S. PATENT DOCUMENTS

| | | | |
|---|---|---|---|
| 5,613,012 | A | 3/1997 | Hoffman et al. |
| 5,615,277 | A | 3/1997 | Hoffman |
| 5,737,439 | A | 4/1998 | Lapsley et al. |
| 5,764,789 | A | 6/1998 | Pare et al. |
| 5,802,199 | A | 9/1998 | Pare et al. |
| 5,805,719 | A | 9/1998 | Pare et al. |
| 5,838,812 | A | 11/1998 | Pare et al. |
| 5,870,723 | A | 2/1999 | Pare et al. |

(Continued)

FOREIGN PATENT DOCUMENTS

| | | |
|---|---|---|
| AU | 750154 B2 | 7/2002 |
| WO | WO 96/36934 A1 | 11/1996 |

(Continued)

OTHER PUBLICATIONS

"Symbian Application: nAlterMe," dated Nov. 8, 2008, url last accessed Feb. 18, 2011: http://dailymobile.se/2008/11/08/symbian-application-nalertme/, 2 pages.

(Continued)

*Primary Examiner* — Olumide T Ajibade Akonai
(74) *Attorney, Agent, or Firm* — Kilpatrick Townsend & Stockton LLP (57) ABSTRACT

Methods, devices, and systems are presented for screen locking or delaying the screen locking of mobile devices, such as smart phones, based on whether the gait of the current user match that of its true, authorized owner. A user's gait can be measured using accelerometers embedded in the device. Other movements, such as where a user normally goes to work, can be measured using GPS or other positional location data and used to lock or delay locking of the screen.

20 Claims, 9 Drawing Sheets

U.S. PATENT DOCUMENTS

| | | | |
|---|---|---|---|
| 5,907,327 A * | 5/1999 | Ogura et al. | 715/764 |
| 5,982,914 A | 11/1999 | Lee et al. | |
| 6,012,039 A | 1/2000 | Hoffman et al. | |
| D425,873 S | 5/2000 | Anderson et al. | |
| 6,131,464 A | 10/2000 | Pare et al. | |
| 6,154,879 A | 11/2000 | Pare et al. | |
| 6,192,142 B1 | 2/2001 | Pare et al. | |
| 6,209,104 B1 | 3/2001 | Jalili | |
| 6,230,148 B1 | 5/2001 | Pare et al. | |
| 6,269,348 B1 | 7/2001 | Pare et al. | |
| 6,366,682 B1 | 4/2002 | Hoffman et al. | |
| 6,369,794 B1 * | 4/2002 | Sakurai et al. | 345/156 |
| 6,397,198 B1 | 5/2002 | Hoffman et al. | |
| 6,411,728 B1 | 6/2002 | Lee et al. | |
| 6,581,042 B2 | 6/2003 | Pare et al. | |
| 6,591,002 B2 | 7/2003 | Lee et al. | |
| 6,594,376 B2 | 7/2003 | Hoffman et al. | |
| 6,662,166 B2 | 12/2003 | Pare et al. | |
| 6,728,397 B2 | 4/2004 | McNeal | |
| 6,879,966 B1 | 4/2005 | Lapsley et al. | |
| 6,920,435 B2 | 7/2005 | Hoffman et al. | |
| 6,950,810 B2 | 9/2005 | Lapsley et al. | |
| 6,957,770 B1 | 10/2005 | Robinson | |
| 6,980,670 B1 | 12/2005 | Hoffman et al. | |
| 6,985,608 B2 | 1/2006 | Hoffman et al. | |
| 7,004,389 B1 | 2/2006 | Robinson et al. | |
| 7,082,415 B1 | 7/2006 | Robinson et al. | |
| 7,152,045 B2 | 12/2006 | Hoffman | |
| 7,185,807 B1 | 3/2007 | Robinson et al. | |
| 7,248,719 B2 | 7/2007 | Hoffman et al. | |
| 7,269,737 B2 | 9/2007 | Robinson | |
| 7,319,987 B1 | 1/2008 | Hoffman et al. | |
| 7,367,049 B1 | 4/2008 | Robinson et al. | |
| 7,387,240 B2 | 6/2008 | Ziegler | |
| 7,389,269 B1 | 6/2008 | Robinson et al. | |
| 7,437,330 B1 | 10/2008 | Robinson et al. | |
| 7,464,059 B1 | 12/2008 | Robinson et al. | |
| 7,483,862 B1 | 1/2009 | Robinson et al. | |
| 7,489,920 B2 * | 2/2009 | Kim | 455/411 |
| 7,497,372 B1 | 3/2009 | Robinson et al. | |
| 7,498,951 B2 * | 3/2009 | Wardimon | 340/691.3 |
| 7,502,761 B2 | 3/2009 | Siegal et al. | |
| 7,512,567 B2 | 3/2009 | Bemmel et al. | |
| 7,526,652 B2 | 4/2009 | Ziegler | |
| 7,533,066 B1 | 5/2009 | Robinson et al. | |
| 7,533,809 B1 | 5/2009 | Robinson et al. | |
| 7,536,352 B2 | 5/2009 | Lapsley et al. | |
| 7,542,590 B1 | 6/2009 | Robinson et al. | |
| 7,545,621 B2 | 6/2009 | Haddad | |
| 7,558,406 B1 | 7/2009 | Robinson et al. | |
| 7,558,407 B2 | 7/2009 | Hoffman et al. | |
| 7,565,329 B2 | 7/2009 | Lapsley et al. | |
| 7,606,401 B2 | 10/2009 | Hoffman et al. | |
| 7,613,659 B1 | 11/2009 | Hoffman et al. | |
| 7,620,605 B2 | 11/2009 | Hoffman et al. | |
| 7,624,073 B1 | 11/2009 | Robinson et al. | |
| 7,631,193 B1 | 12/2009 | Hoffman | |
| 7,688,306 B2 * | 3/2010 | Wehrenberg et al. | 345/158 |
| 7,698,567 B2 | 4/2010 | Hoffman | |
| 7,747,528 B1 | 6/2010 | Robinson et al. | |
| 7,765,164 B1 | 7/2010 | Robinson et al. | |
| 7,769,695 B2 | 8/2010 | Robinson et al. | |
| 7,778,933 B2 | 8/2010 | Robinson et al. | |
| 7,831,468 B1 | 11/2010 | Conte et al. | |
| 7,836,485 B2 | 11/2010 | Robinson et al. | |
| 7,882,032 B1 | 2/2011 | Hoffman | |
| 7,929,960 B2 * | 4/2011 | Martin et al. | 455/419 |
| 7,970,678 B2 | 6/2011 | Lapsley | |
| 8,015,118 B1 | 9/2011 | Robinson et al. | |
| 8,064,931 B2 * | 11/2011 | Sutardja | 455/456.6 |
| 8,072,435 B2 * | 12/2011 | Hsieh et al. | 345/173 |
| 8,280,678 B2 * | 10/2012 | Lee et al. | 702/160 |
| 2004/0073510 A1 | 4/2004 | Logal et al. | |
| 2006/0106734 A1 | 5/2006 | Hoffman et al. | |
| 2006/0265602 A1 | 11/2006 | Robinson | |
| 2007/0162337 A1 | 7/2007 | Hawkins | |
| 2007/0282677 A1 | 12/2007 | Carpenter | |
| 2007/0288319 A1 | 12/2007 | Robinson | |
| 2007/0288320 A1 | 12/2007 | Cooper | |
| 2008/0097851 A1 | 4/2008 | Bemmel | |
| 2008/0147481 A1 | 6/2008 | Robinson | |
| 2008/0271116 A1 | 10/2008 | Robinson et al. | |
| 2008/0280641 A1 * | 11/2008 | Kristensson et al. | 455/556.1 |
| 2009/0046056 A1 * | 2/2009 | Rosenberg et al. | 345/156 |
| 2009/0070270 A1 | 3/2009 | Robinson et al. | |
| 2009/0074256 A1 | 3/2009 | Haddad | |
| 2009/0099944 A1 | 4/2009 | Robinson | |
| 2009/0138366 A1 | 5/2009 | Bemmel | |
| 2009/0177587 A1 | 7/2009 | Siegal | |
| 2009/0228362 A1 | 9/2009 | Lapsley | |
| 2010/0179757 A1 * | 7/2010 | Iketani et al. | 701/214 |
| 2011/0275348 A1 * | 11/2011 | Clark et al. | 455/411 |

FOREIGN PATENT DOCUMENTS

| | | |
|---|---|---|
| WO | WO 98/09227 A1 | 3/1998 |
| WO | WO 98/15924 A1 | 4/1998 |
| WO | WO 98/41947 A1 | 9/1998 |
| WO | WO 99/31621 A1 | 6/1999 |
| WO | WO 00/26849 A1 | 5/2000 |
| WO | WO 00/45247 A1 | 8/2000 |
| WO | WO 00/45320 A1 | 8/2000 |
| WO | WO 00/46710 A1 | 8/2000 |
| WO | WO 00/46737 A1 | 8/2000 |
| WO | WO 00/67187 A1 | 11/2000 |
| WO | WO 01/06440 A1 | 1/2001 |
| WO | WO 01/20531 A1 | 3/2001 |
| WO | WO 02/14984 A2 | 2/2002 |
| WO | WO 2007/092715 A2 | 8/2007 |
| WO | WO 2008/002979 A2 | 1/2008 |

OTHER PUBLICATIONS

U.S. Appl. No. 10/678,646, filed Oct. 6, 2003 (31 pages).

* cited by examiner

AUTHENTICATION AND HUMAN RECOGNITION TRANSACTION USING A MOBILE DEVICE WITH AN ACCELEROMETER

CROSS-REFERENCES TO RELATED APPLICATIONS

This application claims the benefit of U.S. Provisional Application No. 61/264,543, filed Nov. 25, 2009, and U.S. Provisional Application No. 61/264,983, filed Nov. 30, 2009. The applications above are hereby incorporated by reference in their entireties for all purposes.

BACKGROUND

1. Field of the Art

Generally, systems and methods are disclosed for authentication of users of mobile devices based on physical movement data. More specifically, methods and systems are disclosed for locking or delaying a password lock of a mobile device depending on a user's gait or other movement patterns.

2. Discussion of the Related Art

Fraud and identity theft have become more of a problem as more consumers use credit and other payment cards to complete financial transactions. The number of transactions completed through payments cards and their respective accounts, as opposed to through cash and checks, has grown to cover a substantial portion of the financial transactions people make.

As payment methods transform from physical payment cards to mobile devices, such as cellular phones, such devices may be stolen more frequently. With financial transactions conducted from mobile devices, it becomes even more important to verify a user's identity against the true owner of a mobile device.

Current methods for authorizing a user to a device include password-protected timeouts. If a mobile phone has not been used for a few minutes, the screen goes blank or shows a screen saver, and the device is effectively locked. To unlock the device, a user must input a password. This password-protected timeout paradigm can be effective for cases in which a user has left his or her mobile device unattended for a requisite number of minutes and a thief has subsequently made off with the device. The thief, not knowing the password, is not able to unlock the device without considerable effort.

There are problems with password-protected timeouts. Because of the nuisance of having to enter a password whenever the phone has not been used for a while, a user may increase the time between timeouts or turn the password protection off. An increased time between timeouts allows a thief more time to pilfer a mobile device before its screen locks, thus defeating the purpose of the screen lock. The user may also set the password to be one that is easily guessed (e.g., "1234") so that it is easy to enter on the device. An easy-to-guess password is sometimes not much better than no password at all, and it can be counterproductive because it gives a false sense of security.

There is a need in the art for better authentication of users on mobile devices, or, conversely, locking mobile devices for unauthenticated users.

BRIEF SUMMARY

The present disclosure generally relates to methods, devices, and systems for determining whether a person carrying a mobile device is its legitimate owner based on accelerometer data or other data measured from movement of the device. Accelerometers in the device record its legitimate owner's gait and can also integrate accelerations to determine the owner's velocity and location at different points in a day. If the device senses measurements that are distinct from its owner's gait, then the device can lock itself. If the device senses that it is not in the same neighborhood, building, room, etc. as its user is usually in, or that the user is not visiting the same areas as it usually visits, then the device can lock itself. In addition to or instead of locking a device, an email message can be sent to its registered user warning that the device does not recognize who is carrying it.

In the obverse, if a device senses familiar walking patterns or neighborhoods, then a timeout can be delayed or password protection can be waived for an additional timeout period.

An embodiment in accordance with the present disclosure relates to a method of receiving a first set of time series physical movement data of a mobile device, the first set of data acquired while a first user supports the mobile device, comparing, using a processor, the first set of movement data with a second set of time series physical movement data of a second user, and assessing whether the first user is the second user based on the comparison of the first and second sets of movement data. The method also comprises performing an action based on the assessment, which can include locking a display on the mobile device based on an assessment that the first user is not the second user, deleting contents of the mobile device based on such an assessment, or sending an authentication message based on an assessment that the first user is the second user.

The method can further comprise receiving a first set of audio voice data from the mobile device, the first set of audio voice data acquired while the first user speaks into the mobile device, and comparing the first set of audio voice data with a second set of audio voice data of the second user. The assessment is (further) based on the comparison of the first and second sets of audio data.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, the present disclosure relates to methods and associated software, firmware, and hardware for locking a mobile phone or other electronic mobile device when it determines from accelerometer data that it is not being carried by its authorized owner. Global positioning system (GPS), cellular phone triangulation, or other position, velocity, and/or acceleration measurement data can be used. Magnetic compass, gyroscope, or other orientation data can be used. If a mobile device detects that its present carrier's gait is different from that of its owner, then it can lock itself down and prompt for a password. If a mobile device detects that it is not in its owner's home neighborhood, office building, or usual room or cubicle, then the mobile device can lock itself down and prompt for a password.

In alternate embodiments, the mobile device may sense that it is still being carried by its authorized owner. In those cases, a password-protected timeout can be delayed. The password protection can be delayed as long as the device senses that it is still being carried or carted around by its true owner or another authorized to carry the device.

Technical advantages include more security for mobile devices that currently only employ a password-protected timeout. A layer besides a password is used to prevent unauthorized access, that layer being physical jostling or location data of the device. Technical advantages also include less nuisance password-protected timeouts for users. As long as the phone recognizes that it is being held by its owner, it will delay counting down its lock-screen timeout. The method may also be able to detect when a person is injured, or getting less and less mobile over time, and thus alert the user or call for help.

"Time series physical movement data" includes data pertaining to physical movement, such as position data, velocity data, acceleration data, pulse data, and other translational movement data that occurs over time. Physical movement data can also include orientation data such as pitch, yaw, and roll data, include angular rates, angular accelerations, etc. All of the degrees of freedom of the device may be used, or only a subset may be used. Degrees of freedom can be orthogonal with respect to one another, non-orthogonal, with respect to each other, or aggregated from multiple degrees of freedom into one data set (e.g., x, y, and z acceleration data sets can be combined into a single data set to reflect a total number of G's on a device.) Time series data can include data that is taken, stored, or associated with time, including data that is stored chronologically or out of chronological sequence. Time series data can include data that is sampled at periodic time intervals, non-periodic time intervals, event driven, or other data associated with time.

Comparing sets of time series data can include least squares matching, machine-learning techniques, neural techniques, and other comparison techniques of data sets. Comparisons can attempt to find differences between data sets that are below an absolute threshold, minimal with respect to comparisons with other data, or other comparison techniques.

A "movement type" or gait type can include classifications such as walking, running, moving by wheelchair, moving by car, or other distinct movements. A movement type can include a classification that a device has been put down or is no longer supported by a user.

A "support type" can include classifications on how a device is held, worn, balanced, or otherwise supported, such as if a device is held in a person's hands, in a coat or pants pocket, being carried in a hand, or being tossed up and down.

Figure 1:
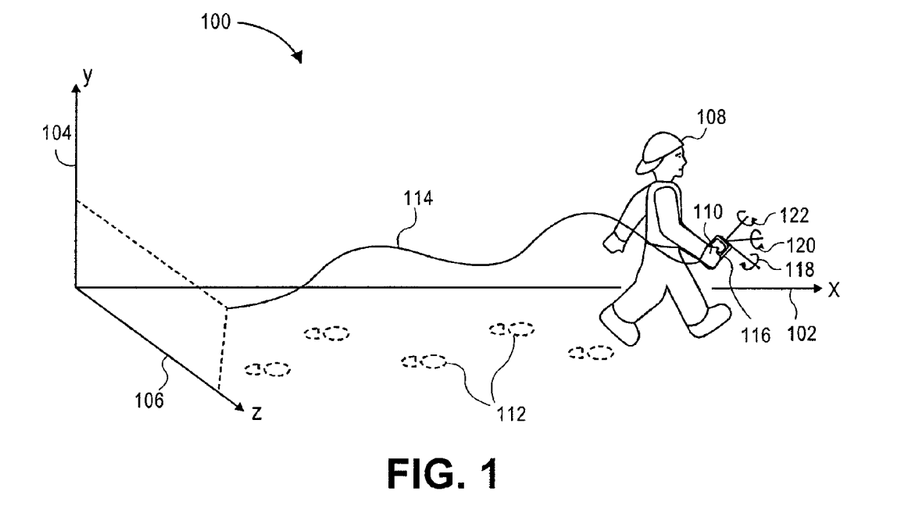
FIG. 1 illustrates a measured gait of a user carrying a mobile device in accordance with an embodiment.

FIG. 1 illustrates a measured gait of an authorized user carrying a mobile device in his hand according to an embodiment. Authorized user 108 carries mobile device 116 in his hand 110. As he walks, user 108 steps here and there, planting footsteps 112, and swinging mobile device 116 through space described by trajectory 114.

Trajectory 114 can be described with respect to Euclidean, orthogonal axes, x, y, and z. such as those shown as x axis 102, y axis 104, and z axis 106. Other coordinate systems are, of course, applicable as well. In addition to trajectory 114, the orientation of the mobile device can be described by reference to pitch axis 118, roll axis 120, and yaw axis 122. Each of the components of trajectory 114 or orientation can be saved as data series with respect to time. For example, x-position data in inches can be saved with respect to time in seconds.

Authorized user 108 has a certain way that he walks and a certain way that he swings his arms when holding a device. He walks straight ahead, without swagger or other major side-to-side motion. His arms swing slightly and fluidly, as shown by smooth, lightly curved trajectory 114. He carries mobile device 116 so that its top points diagonally up and outward. It wavers slightly from side to side.

Figure 2:
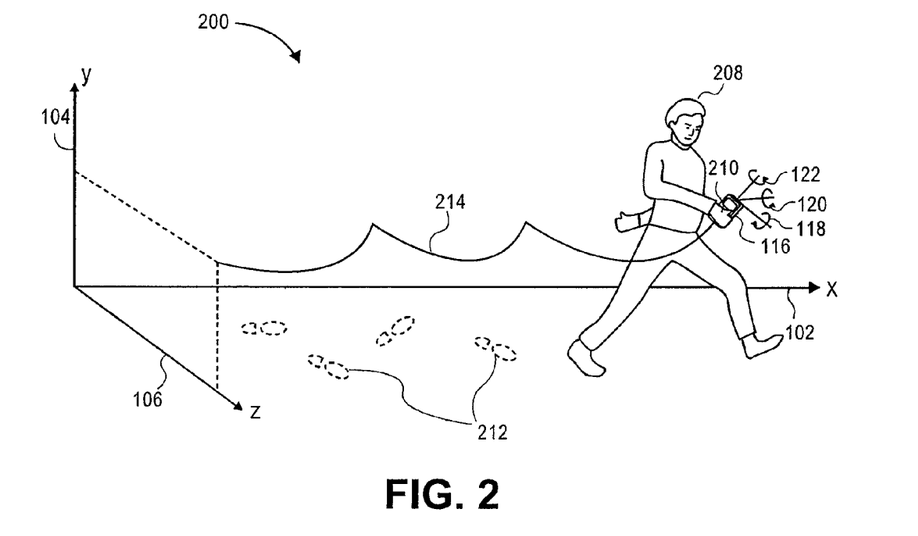
FIG. 2 illustrates a measured gait of another user carrying the mobile device of FIG. 1 in accordance with an embodiment.

FIG. 2 illustrates a measured gait of an unauthorized user, a thief, carrying a mobile device in his hand according to an embodiment. Thief 208 carries mobile device 116 in his hand 210. As he walks, thief 208 plants footsteps 212 and swings mobile device 116 through space described by trajectory 214.

Like trajectory 114, trajectory 214 can be described with respect to x axis 102, y axis 104, and z axis 106. The orientation of the mobile device can be described by reference to pitch axis 118, roll axis 120, and yaw axis 122.

Thief 208 has a certain way that he walks and a certain way that he swings his arms when holding a device. These traits may be more pronounced when he is nervous or in a determined state of mind, as when he is making off with someone else's property. Thief 208 of the exemplary figure steps broadly with toes pointed outward. His arms swing abruptly and with purpose, as shown by peaked, jerky trajectory 214. He holds mobile device 116 so that its top points similarly to they way that authorized user 108 holds his.

Although they both hold the device so that it is pointed in the same direction, authorized user 108 and thief 208 have different gaits and different ways that they swing their arms. A comparison of trajectories 114 and 214 reveals differences in stride, periodicity, side-to-side movement, peakedness, and other attributes of the time series physical data that describes the mobile device's movement through space.

Figure 3:
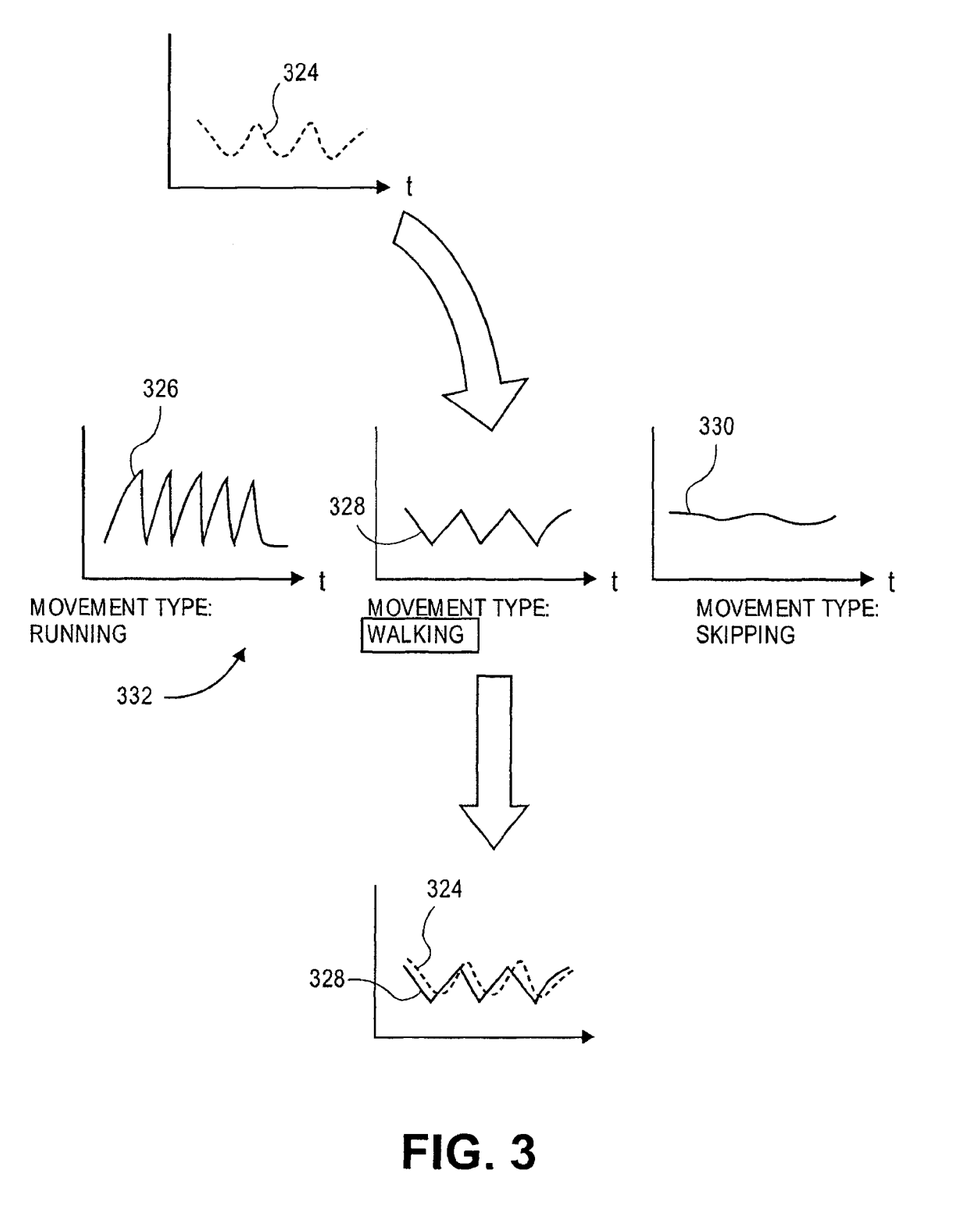
FIG. 3 illustrates a classification of a type of gait in accordance with an embodiment.

FIG. 3 illustrates a classification of a type of gait in accordance with an embodiment. In the uppermost chart is shown recently measured time series data 324. The recently measured time series data can be x, y, or z data pertaining to position, velocity, acceleration, etc. Time series data 324 can also be pitch, roll, or yaw data pertaining to absolute angle, angular velocity/frequency, angular acceleration, etc.

Time series data 324 is compared with movement types 332. Movement type 'running,' shown as pre-recorded time series data 326, has a different profile from movement type 'walking,' shown as pre-recorded time series data 328. Movement type 'walking' has a different profile from movement type 'skipping,' shown as pre-recorded time series data 330. Because time series data 324 matches most closely to that of 'walking' time series data 328, prerecorded 'walking' time series data 328 is selected for further comparison.

In the bottom chart of the figure, recently measured time series data 324 is aligned with pre-recorded time series data 328. In some embodiments, both sets of time series data may be normalized to a standard or unitless scale. Comparison of recently measured time series data 324, which may be measured from a person currently carrying a mobile device, to pre-recorded time series data 328, which may have been measured during an initialization process by the owner when he purchased the mobile device, reveals that the data are similar in frequency, amplitude, and peakedness.

Based on the similarities between recently measured time series data 324 and pre-recorded time series data 328, a determination is made that the person who is walking with the device associated with data 324 is probably the same person who walked with the device associated with data 328 when it was purchased. A screen lock can then be delayed based on this determination. This determination may also play into positively authorizing the person for financial transactions. For example, a determination that the device is carried by the same person can reduce a score estimating probable fraud in a transaction being conducted or about to be conducted. The determination can be sent to a transaction server in order to modify the potential fraud score.

Figure 4:
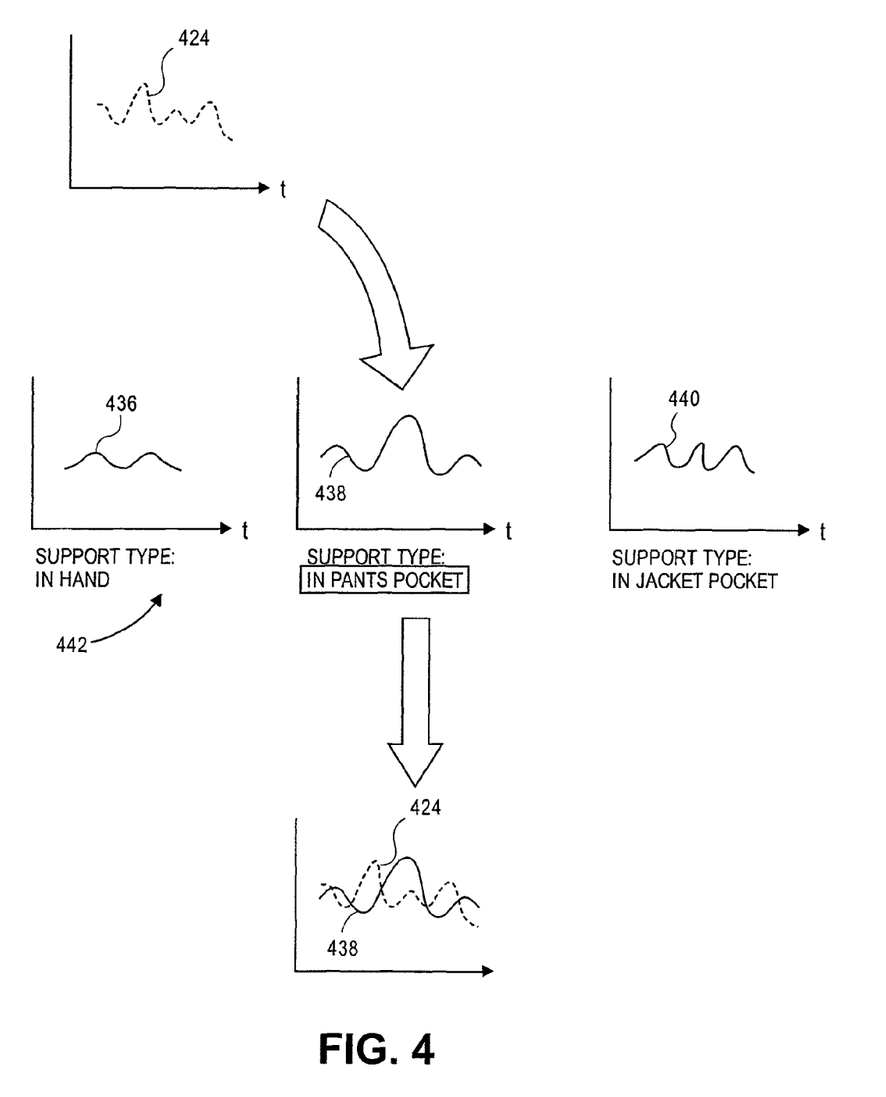
FIG. 4 illustrates a classification of a type of carrying style in accordance with an embodiment.

FIG. 4 illustrates a classification of a type of carrying style in accordance with an embodiment. In the uppermost chart is shown recently measured time series data 424.

Time series data 424 is compared with support types 442. Support type 'in hand,' shown as pre-recorded time series data 436, has a different profile from support type 'in pants pocket,' shown as pre-recorded time series data 438. Support type 'in pants pocket' has a different profile from support type 'in jacket pocket,' shown as pre-recorded time series data 440. Because time series data 424 matches most closely to that of 'in pants pocket' time series data 438, 'in pants pocket' time series data 438 is selected for further comparison.

In the bottom chart of the figure, recently measured time series data 424 is aligned with pre-recorded time series data 438. In some embodiments, both sets of time series data may be normalized to a standard or unitless scale. Comparison of recently measured time series data 424, which may be measured from a person currently carrying a mobile device, to pre-recorded time series data 438, which may have been measured during an initialization process by the owner when he purchased the mobile device, reveals that the data are similar in amplitude in some respects but different in frequency, peakedness, and low-high rhythm.

Based on the differences between recently measured time series data 424 and pre-recorded time series data 438, a determination is made that the person who is carrying the device in his or her pants pocket associated with data 424 is not the same person who carried the device in a pants pocket associated with data 438. A screen (or other features) of the device may then be locked based on this determination, and/or a message may be emailed to the legitimate owner of record. A message may also be sent to a financial transaction network to warn it that any purchases using the phone may be suspect.

Figure 5:
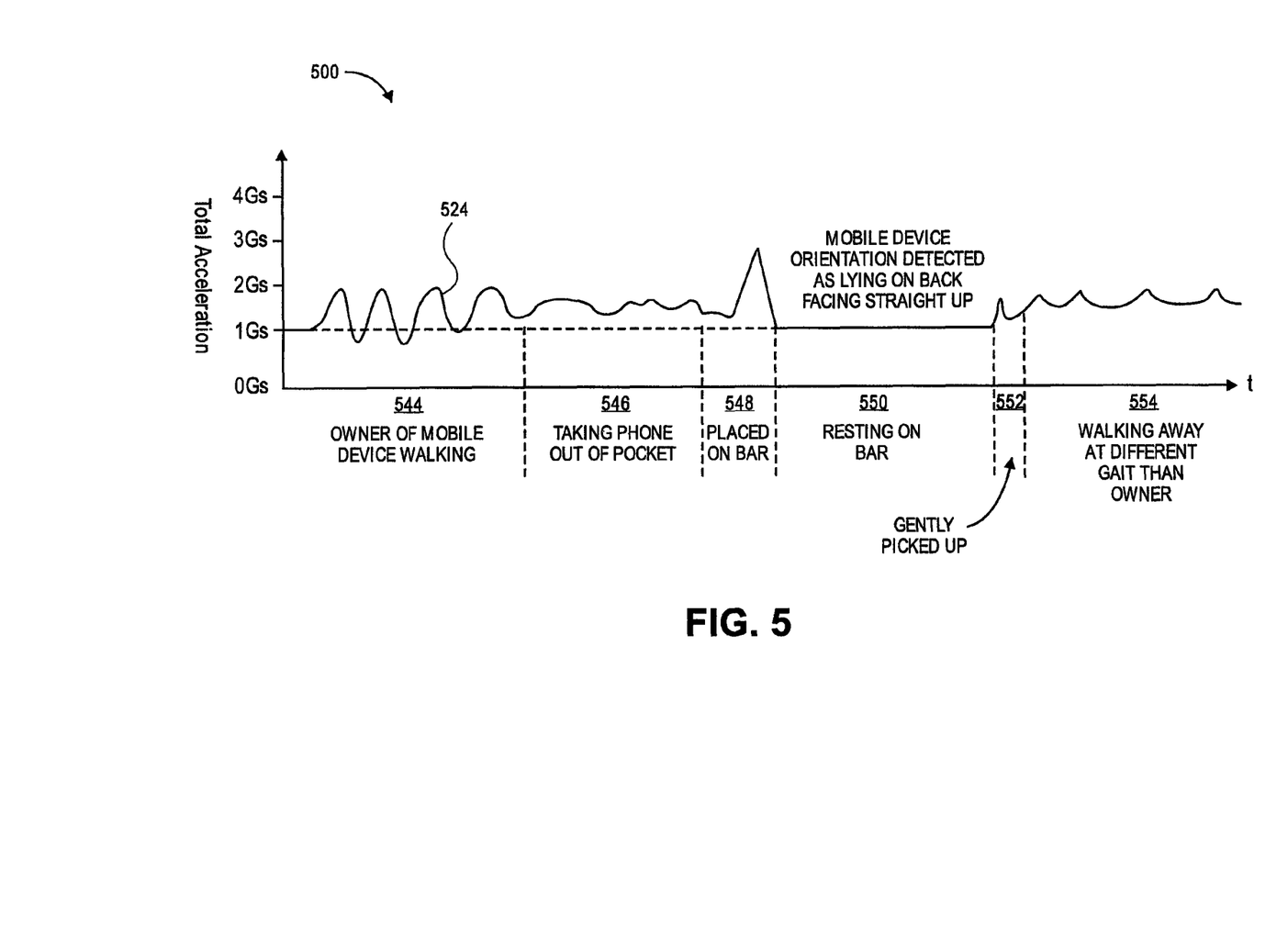
FIG. 5 illustrates accelerometer data with respect to time in accordance with an embodiment.

FIG. 5 illustrates accelerometer data from a smart phone mobile device with respect to time in accordance with an embodiment. Total acceleration in G's (i.e., multiples of the acceleration of the Earth's gravity on a body at rest at sea level) is plotted versus time. Time series data 524 stretches from when an owner of the mobile device walks into an establishment, such as a bar, until a thief walks away after having snatched the device.

During time period 544, an owner of the phone carries it in her pocket while walking. Accelerometers in the phone measure a sinusoidal swinging as the phone sways freely in her pocket. During time period 546, the owner stops and removes the phone from her pocket, looking at it briefly and pecking at a few buttons. Accelerations are low because the phone is steadied by the owner so that she can see the screen while typing. During time period 548, the phone is placed on a bar, the practice of many patrons who want their phone to be readily accessible and visible in case of an incoming call or text message. There is a large spike in the acceleration data due to the phone lightly thumping down onto the hard surface of the bar. During time period 550, the phone rests on the bar. Only one G of acceleration, that due to gravity, is measured by the phone's accelerometers. The acceleration is constant because the bar on which it rests is rigid and steady. The phone's screen saver has not had a chance to timeout during this time.

During time period 552, the phone is gently picked up by a passing thief. There is a small spike in the accelerometer data as the phone is grabbed and pocketed by the thief. During time period 554, the thief walks swiftly away from the bar, steadily but with purpose to put as much distance between himself and the now-phoneless larceny victim. The accelerations show peaks between lulls—a different walking pattern than before.

The accelerations of time period 554 are compared with those pre-recorded by the victim back when she had first acquired the phone. When she first acquired the phone, the owner 'trained' the phone to recognize her gait using several different support styles (e.g., held in her hand, in her jacket pocket, in her pants pocket, in her purse) and a couple of different gaits (e.g., walking, running). Those past-recorded accelerations of her walking with the phone in her pocket were probably similar to those shown in time period 544.

The phone determines from the accelerations of time period 554 that its current type of movement is 'walking' (see FIG. 3), and that it is currently inside a pocket (see FIG. 4). Having determined that its current user is walking with it in a pocket, the phone proceeds to compare its current accelerations (i.e., accelerations of time period 554) with past, pre-recorded walking-with-phone-in-pocket accelerations.

The time series accelerations are markedly different from one another. The phone assess that the difference is substantial and not due to natural variation of the same person's ambulations or due to sensor or A/D converter noise. Therefore, the phone, instead of waiting for its full timeout period to end, locks the phone and prompts for a password.

Figure 6:
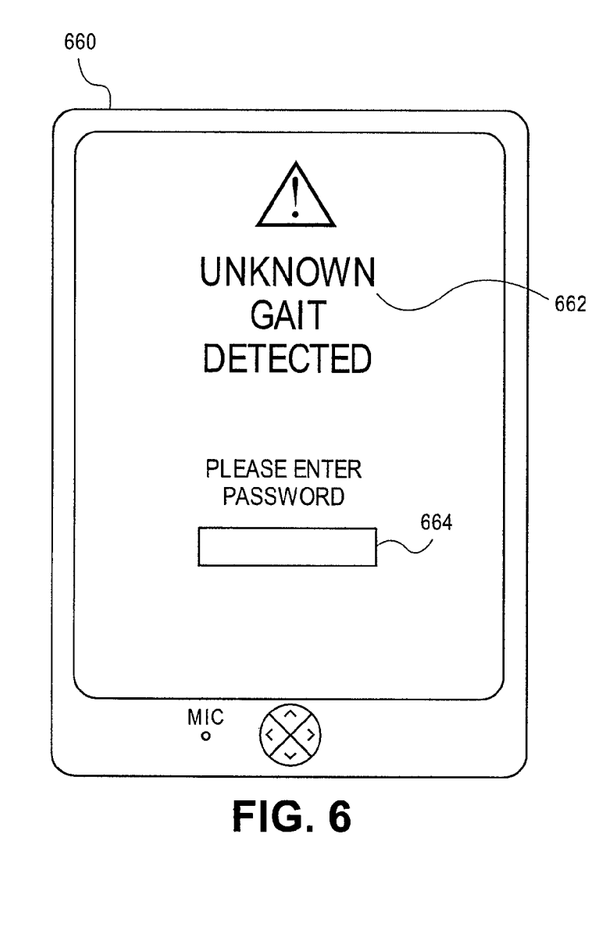
FIG. 6 illustrates a mobile device screen lock in accordance with an embodiment.

FIG. 6 illustrates a smart phone that is locked. Locked smart phone 660 displays warning 662 that it detects a gait that is unknown. Smart phone 660 has assessed the differences between movement data of a current user and pre-recorded movement data of a known, authorized user, and determined that the differences are substantial. Password prompt 664 is displayed for a user to enter.

If the assessment is incorrect and that the true owner is still carrying the phone, then the user is only slightly burdened by having to re-enter a password. A user can re-train the device to recognize his or her gait. If the assessment is correct and a thief cannot enter the correct password, then the phone can lock itself down further or even delete all of its contents.

The assessment can alter the number of times that a password can be attempted to be re-entered. For example, a device may allow a user to try up to three times to enter his or her password in order to unlock the device screen. If the accelerometer data shows that the device is probably with the true owner, then the device can allow four, five, or more tries. If the accelerometer data shows that the device is probably not with the true owner, then the device may only allow one or two tries. Other verification methods besides or in addition to passwords or personal identification numbers (PINs) can be employed.

Figure 7:
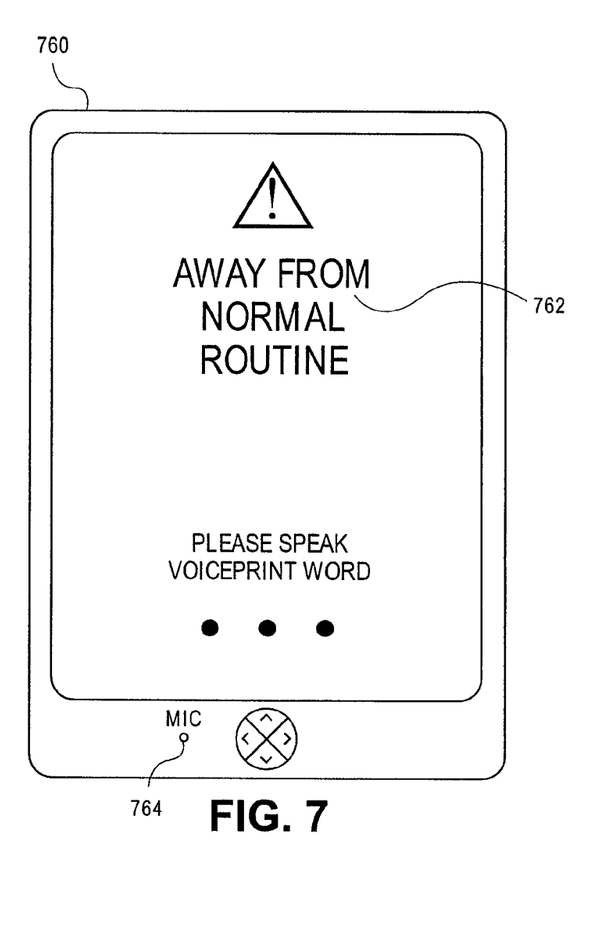
FIG. 7 illustrates a mobile device prompting for an audio voiceprint in accordance with an embodiment.

FIG. 7 illustrates a smart phone prompting for an audio voiceprint in accordance with an embodiment. Locked smart phone 760 displays warning 762 that it is away from a user's normal routine. For example, a user's gait might be unrecognized and/or it may be outside its usual neighborhood, office complex, or set of rooms that its owner normally frequents.

If a user has a habit of visiting a local coffee shop each morning before work, taking a particular elevator at his office building, and then making a pass by a facsimile machine before arriving at his office, then these customs can be recorded and recognized by a mobile device. In effect, the mobile device records features of a user's position, velocity, etc. that relate to his personal pattern before work. If one day the phone goes to the local coffee shop but then starts going down a back alley instead of going to the office building and boarding the elevator, the phone can detect the different pattern and lock itself.

In the exemplary embodiment, a user is prompted to speak a password or other say something into smart phone microphone 764 so that audio voice data can be received by the smart phone. The audio voice data can be compared with pre-recorded voice data so that a proper voiceprint is determined. If the audio voice data matches, then access is granted. If the voice data does not match, then the user may be prompted to try again.

Figure 8:
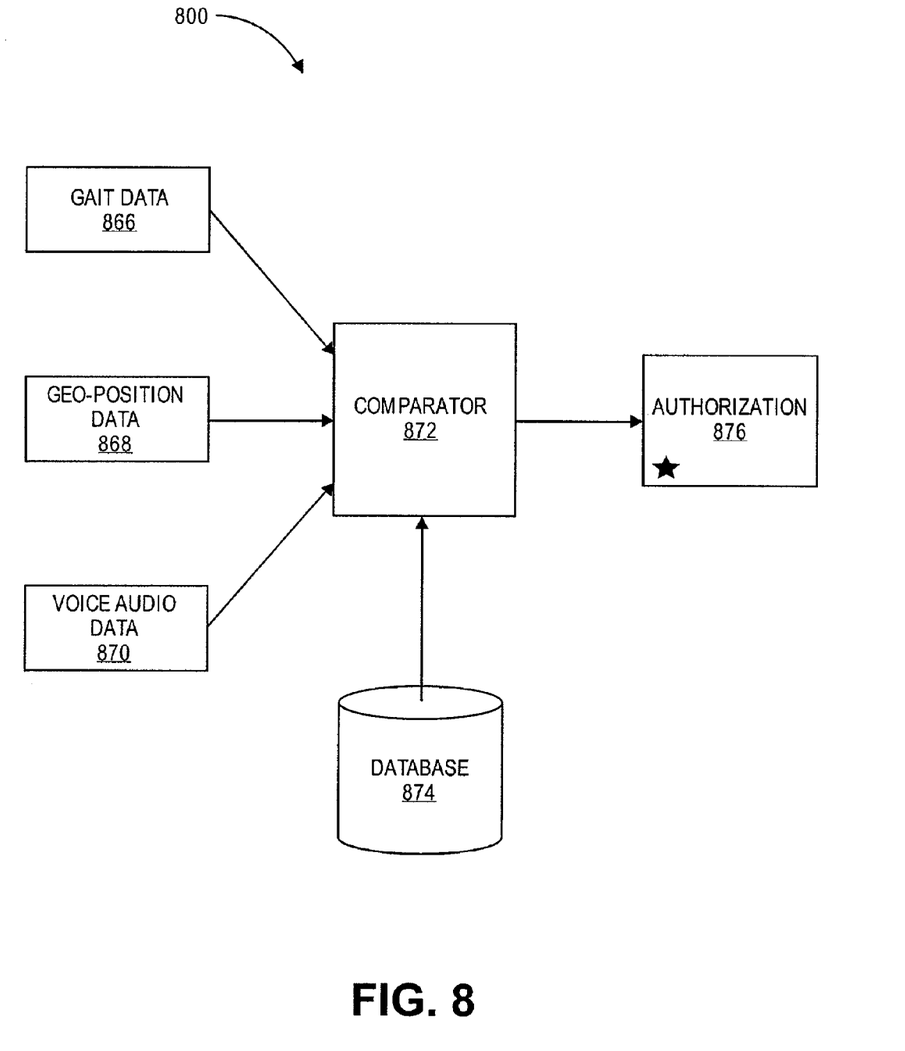
FIG. 8 illustrates a comparator in accordance with an embodiment.

FIG. 8 illustrates a comparator in accordance with an embodiment. In system 800, gait data 866, such as that from accelerometers, geo-position data 868, such as that from GPS signals, and/or voice audio data 870, such as that from a microphone, are input into comparator 872. Comparator 872 attempts to match the incoming data with stored data in database 874. The database data can be considered 'truth data' because it was recorded under conditions presenting a high likelihood that the recorded data is associated with an authorized person.

Comparator 872 uses least squares matching, machine training, neural techniques, parametric, or other comparison and/or matching techniques as known in the art to compare the incoming data with recorded data in database 874. A numerical probabilistic estimate of whether the users are the same can be computed. If the estimate is more than a threshold, then authorization 876 is sent. The authorization can include a simple Boolean value returned from a function, a security token, or other authorizations as known in the art. If the estimate is less than the threshold, then authorization can be withheld.

In alternate embodiments, comparator 872 sends a message, such as an email, to its owner of record to inform the owner that it does not recognize the gait of who it is with. The message can also be a text message to another device related to the user, such as a device owned by the user's parents or spouse.

Figure 9:
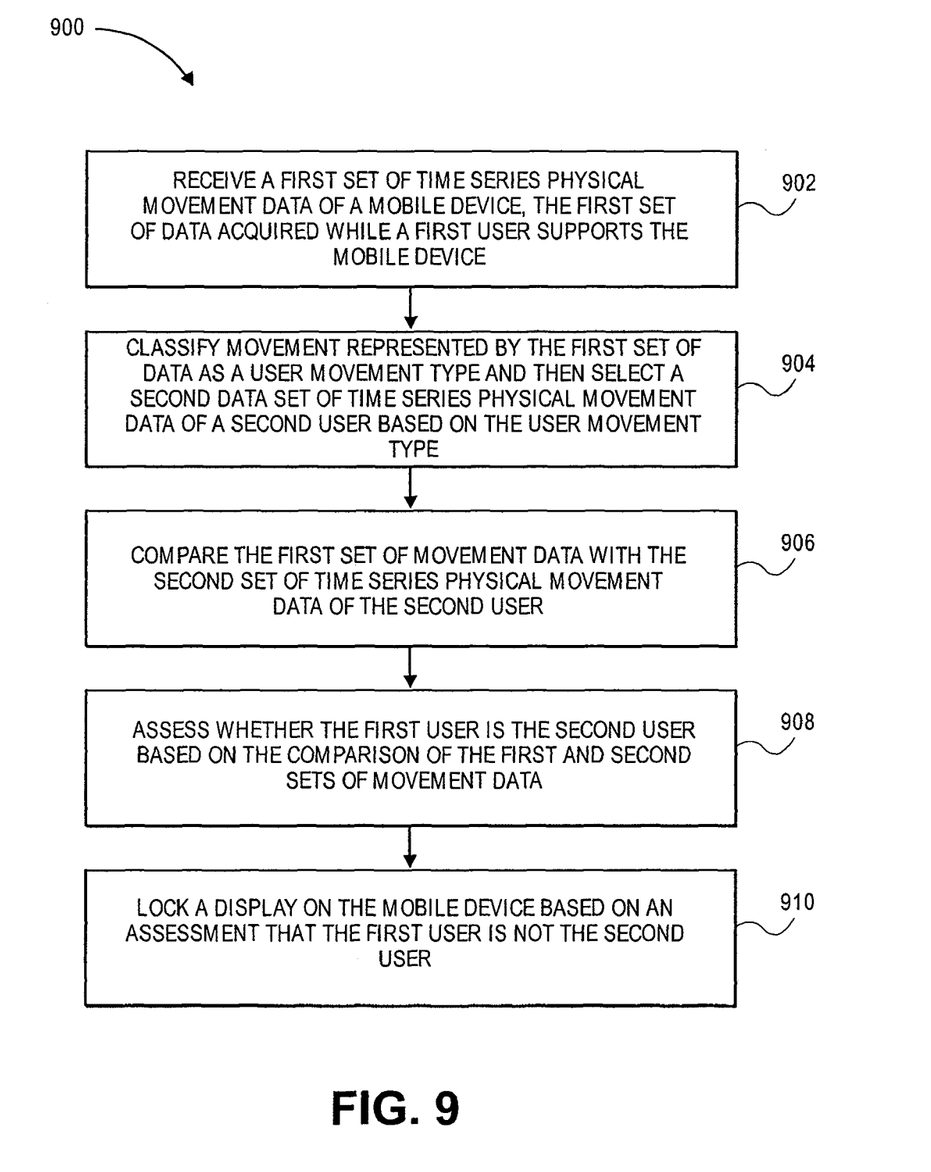
FIG. 9 is a flowchart illustrating a process in accordance with an embodiment.

FIG. 9 is a flowchart illustrating a process in accordance with an embodiment. Operations in the flowchart can be performed by a computer processor or non-computer mechanisms. The process can be coded in software, firmware, or hardware. Process 900 includes operations that are optional. In operation 902, a first set of time series physical movement data of a mobile device are received. The first set of data is acquired while a first user supports the mobile device. In operation 904, movement represented by the first set of data is classified as a user movement type. A second data set is selected based on the user movement type. In operation 906, the first set of movement data is compared with a second set of time series physical movement data of a second user. In operation 908, it is assessed whether the first user is the same person as the second user based on the comparison of the first and second sets of movement data. In operation 910, a display on the mobile device is locked based on an assessment that the first user is not the second user.

Figure 10:
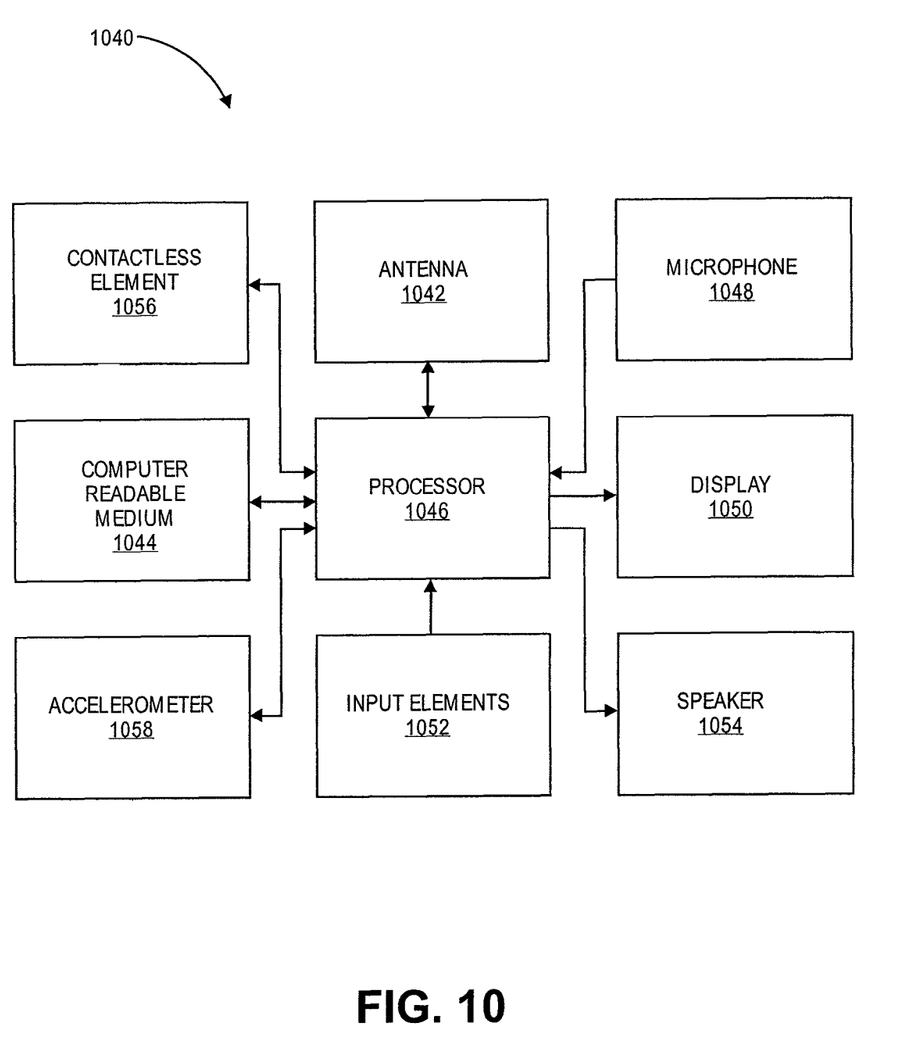
FIG. 10 shows a block diagram of a portable consumer device in accordance with an embodiment.

FIG. 10 shows a block diagram of a portable consumer device or mobile device and subsystems that may be present in computer apparatuses in systems according to embodiments.

An exemplary portable consumer device 1040 in the form of a phone may comprise a computer readable medium and a body. The computer readable medium 1044 may be present within the body of the phone, or may be detachable from it. The body may be in the form a plastic substrate, housing, or other structure. The computer readable medium 1044 may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credit cards. Such tracks include Track 1 and Track 2. Track 1 ("International Air Transport Association") stores more information than Track 2 and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must generally abide by it. It contains the cardholder's account, encrypted PIN, plus other discretionary data.

The portable consumer device 1040 may further include a contactless element 1056, which is typically implemented in the form of a semiconductor chip (or other data storage element) with an associated wireless transfer (e.g., data transmission) element, such as an antenna. Contactless element 1056 is associated with (e.g., embedded within) portable consumer device 1040, and data or control instructions transmitted via a cellular network may be applied to contactless element 1056 by means of a contactless element interface (not shown). The contactless element interface functions to permit the exchange of data and/or control instructions between the mobile device circuitry (and hence the cellular network) and an optional contactless element 1056.

Contactless element 1056 is capable of transferring and receiving data using a near field communications ("NFC") capability (or near field communications medium) typically in accordance with a standardized protocol or data transfer mechanism (e.g., ISO 14443/NFC). Near field communications capability is a short range communications capability, such as RFID, Bluetooth®, infra-red, or other data transfer capability that can be used to exchange data between the portable consumer device 640 and an interrogation device. Thus, the portable consumer device 1040 is capable of communicating and transferring data and/or control instructions via both cellular network and near field communications capability.

The portable consumer device 1040 may also include a processor 1046 (e.g., a microprocessor) for processing the functions of the portable consumer device 1040 and a display 1050 to allow a consumer to see phone numbers and other information and messages. The portable consumer device 1040 may further include input elements 1052 to allow a consumer to input information into the device, a speaker 1054 to allow the consumer to hear voice communication, music, etc., and a microphone 1048 to allow the consumer to transmit her voice through the portable consumer device 1040. The portable consumer device 1040 may also include an antenna 1042 for wireless data transfer (e.g., data transmission).

Portable consumer device 1040 may be used by a buyer to initiate push payments. In some implementations, portable consumer device 1040 can include an interface to allow the buyer to create a payment request message. The portable consumer device 1040 can then send the payment request message to a payment processing network using contactless element 1056 or over a wireless or wired communications channel.

Portable consumer device 1040 can include accelerometer(s) 1058. Multiple accelerometers can be oriented orthogonally or non-orthogonally to each other.

Figure 11:
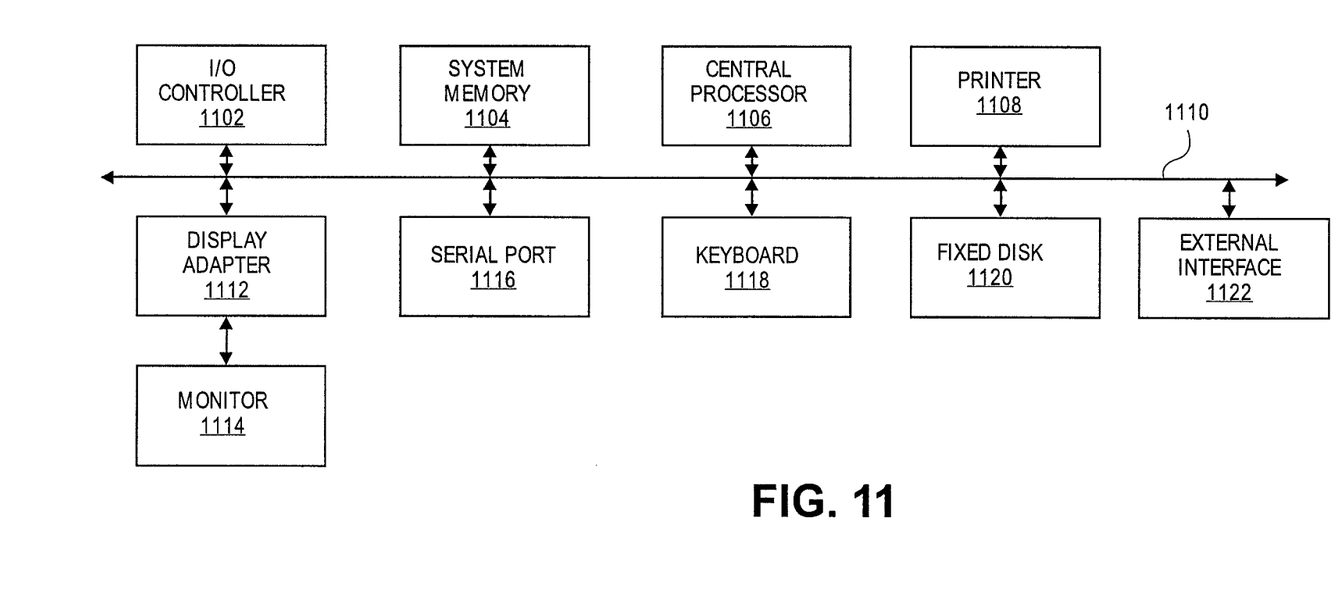
FIG. 11 shows a block diagram of an exemplary computer apparatus that can be used in some embodiments.

FIG. 11 shows a block diagram of an exemplary computer apparatus that can be used in some embodiments.

The subsystems shown in the figure are interconnected via a system bus 1110. Additional subsystems such as a printer 1108, keyboard 1118, fixed disk 1120 (or other memory comprising computer readable media), monitor 1114, which is coupled to display adapter 1112, and others are shown. Peripherals and input/output (I/O) devices, which couple to I/O controller 1102, can be connected to the computer system by any number of means known in the art, such as through serial port 1116. For example, serial port 1116 or external interface 1122 can be used to connect the computer apparatus to a wide area network such as the Internet, a mouse input device, or a scanner. The interconnection via system bus 1110 allows the central processor 1106 to communicate with each subsystem and to control the execution of instructions from system memory 1104 or the fixed disk 1120, as well as the exchange of information between subsystems. The system memory 1104 and/or the fixed disk 1120 may embody a computer readable medium.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving a first set of time series physical movement data of a mobile device, the first set of data acquired while a first user carries the mobile device;
    receiving a second set of time series physical movement data of the mobile device, the second set of data acquired while a second user carries the mobile device;
    comparing, using a processor, the first set of time series physical movement data with the second set of time series physical movement data;
    determining a probability of whether the first user is the second user based on the comparison of the first and second sets of movement data;
    assessing whether the first user is the second user based on the determined probability; and
    performing an action based on the assessment.

2. The method of claim 1 further comprising:
    locking a display on the mobile device based on an assessment that the first user is not the second user.

3. The method of claim 1 further comprising:
    sending an authentication message based on an assessment that the first user is the second user.

4. The method of claim 1 further comprising:
    receiving a first set of audio voice data from the mobile device, the first set of audio voice data acquired while the first user speaks into the mobile device; and
    comparing the first set of audio voice data with a second set of audio voice data of the second user,
    wherein the assessment is further based on the comparison of the first and second sets of audio data.

5. The method of claim 1 further comprising:
    classifying movement represented by the first set of data as a user movement type and then selecting the second data set based on the user movement type.

6. The method of claim 5 wherein the movement represented by the first set of data is acquired while the first user is walking.

7. The method of claim 1 further comprising:
    classifying movement represented by the first set of data as a support movement type and then selecting the second data set based on the support movement type.

8. The method of claim 7 wherein the movement represented by the first set of data is acquired while the first user is holding the mobile device in his or her hand.

9. The method of claim 1 wherein comparing includes parametric comparisons of the sets of movement data.

10. The method of claim 1 wherein the assessing comprises determining a numerical probabilistic estimate that the second user is the first user.

11. The method of claim 1 wherein the first set of physical movement data includes data from an accelerometer coupled to the mobile device.

12. The method of claim 11 wherein the first set of physical movement data includes data from multiple accelerometers coupled to the mobile device, the multiple accelerometers positioned orthogonal to one another within the mobile device.

13. The method of claim 11 wherein the accelerometer is within the mobile device.

14. The method of claim 1 wherein the first set of physical movement data includes data from a global positioning system (GPS) receiver or a cellular triangulation engine in the mobile device.

15. The method of claim 1 wherein the physical movement data includes data from a gyroscope or compass in the mobile device.

16. The method of claim 1 wherein the physical movement data comprise position, velocity, and acceleration data.

17. A machine-readable tangible storage medium embodying information indicative of instructions for causing one or more machines to perform operations comprising:
    receiving a first set of time series physical movement data of a mobile device, the first set of data acquired while a first user carries the mobile device;
    receiving a second set of time series physical movement data of the mobile device, the second set of data acquired while a second user carries the mobile device;
    comparing, using a processor, the first set of time series physical movement data with the second set of time series physical movement data;
    determining a probability of whether the first user is the second user based on the comparison of the first and second sets of movement data;
    assessing whether the first user is the second user based on the determined probability; and
    performing an action based on the assessment.

18. The machine-readable tangible storage medium of claim 17 wherein the operations further comprise:
    locking a display on the mobile device based on an assessment that the first user is not the second user.

19. A computer system executing instructions in a computer program, the computer program instructions comprising program code for performing operations comprising:
    receiving a first set of time series physical movement data of a mobile device, the first set of data acquired while a first user carries the mobile device;
    receiving a second set of time series physical movement data of the mobile device, the second set of data acquired while a second user carries the mobile device;
    comparing, using a processor, the first set of time series physical movement data with the second set of time series physical movement data;
    determining a probability of whether the first user is the second user based on the comparison of the first and second sets of movement data;
    assessing whether the first user is the second user based on the determined probability; and
    performing an action based on the assessment.

20. The computer system of claim 19 wherein the operations further comprise:
    locking a display on the mobile device based on an assessment that the first user is not the second user.

* * * * *